C. A. BAUMANN.
SAMPLER FOR VACUUM PANS.
APPLICATION FILED OCT. 30, 1911.
1,041,725.
Patented Oct. 22, 1912.
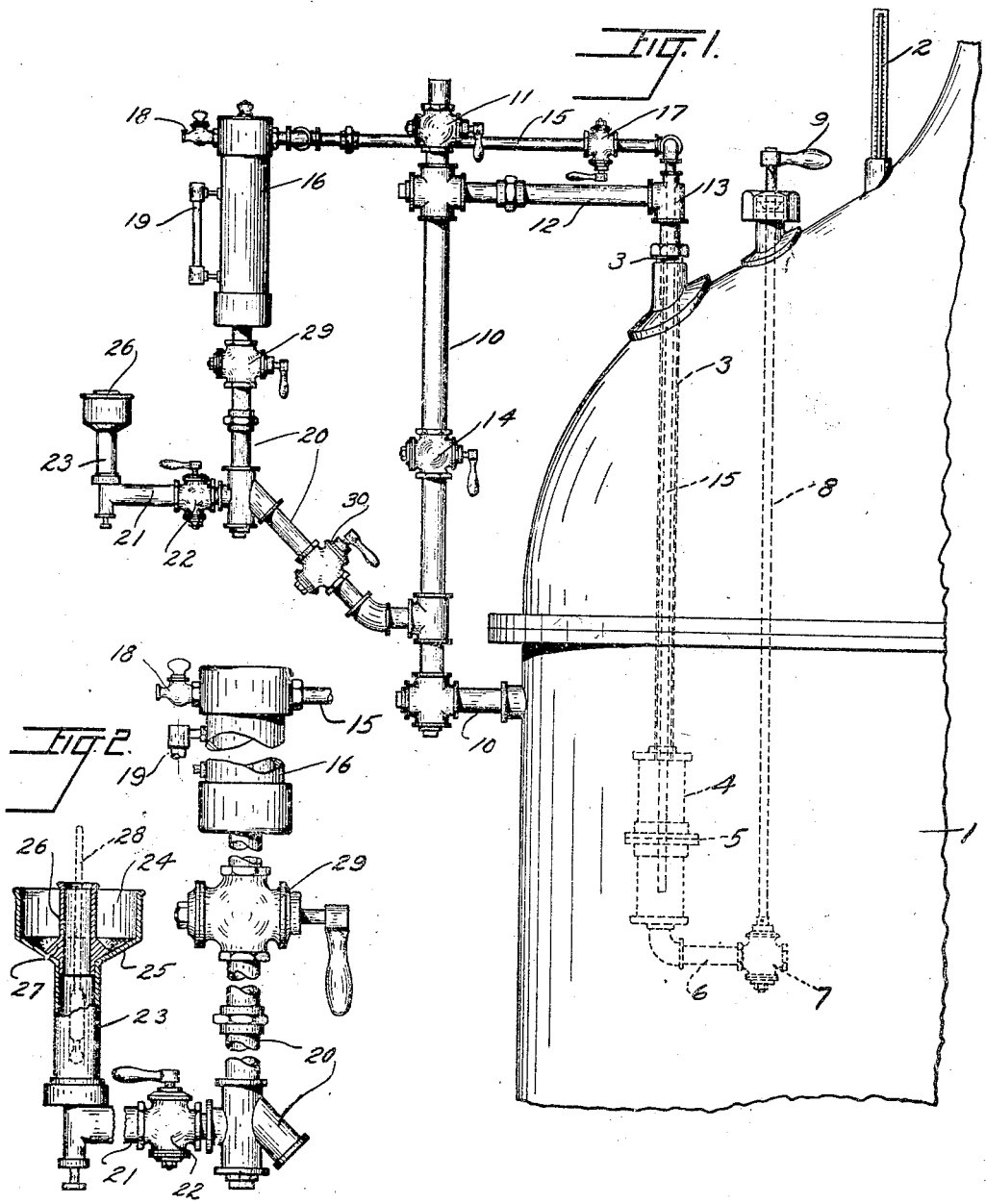
WITNESSES:
INVENTOR
Carl A. Baumann
BY
Robt. Klotz
ATTORNEY

UNITED STATES PATENT OFFICE.

CARL A. BAUMANN, OF JEFFERSON, WISCONSIN.

SAMPLER FOR VACUUM-PANS.

1,041,725.  Specification of Letters Patent.  Patented Oct. 22, 1912.

Application filed October 30, 1911. Serial No. 657,613.

*To all whom it may concern:*

Be it known that I, CARL A. BAUMANN, a citizen of the United States, and residing at Jefferson, in the county of Jefferson and State of Wisconsin, have invented a new and useful Improvement in Samplers for Vacuum-Pans, of which the following is a complete specification.

The main objects of this invention are to provide an improved sampler such as is used for sampling milk; to provide a sampler adapted to enable the operator to read his samples without leaving the operating platform and losing sight of his thermometer and gages; to provide a sampler adapted to give a better sample respecting the quantity of milk obtained than has heretofore been possible; to provide a sampler adapted to register at a higher temperature than that obtained by the old method of sampling; and to provide a cheap and simple device adapted to be directly connected to the vacuum pan and to be supplied by means of atmospheric pressure with the milk or other fluid to be tested.

A specific embodiment of the invention is illustrated in the accompanying drawings, in which:

Figure 1 is a fragmentary side elevation of a vacuum pan with a sampler embodied in this invention attached thereto. Fig. 2 is a fragmentary side elevation, partly in section of the sampling and feeding cups.

In the construction shown, the vacuum pan 1 is of the usual or ordinary construction and is provided near its top with a thermometer 2 adapted to show the internal temperature of the pan. Extending through the top of the pan, near one side thereof, and reaching into the lower portion of the pan, is a pressure pipe 3. On the lower end of the pipe 3, in position to be submerged in the milk, is a reservoir 4 which is constructed in upper and lower sections which are joined together by a union 5, thereby permitting the reservoir to be taken apart to enable it and the pipe 3 to be cleaned. Extending downwardly and laterally from the lower end of the reservoir 4 is an intake pipe 6, having a valve or cock 7 at its end for the admission of milk from the pan. For the purpose of operating said valve a rod 8 is attached to the valve closure and extends upwardly through the top of the pan and is provided with a lever 9 at its upper end in position to be grasped by the operator.

An equalizing pipe 10 leads from the side of the pan at a point above the level of the milk and extends upwardly and is provided at its upper end with an air valve or cock 11 at a point above the end of the pipe 3, and immediately below said cock is a horizontal pressure pipe 12 connecting the pipe 10 with the upper end of the pressure pipe 3 by means of a T coupling 13 on the upper end of the pipe 3. Beneath the pipe 12 the equalizing pipe 10 is provided with a stop cock 14 adapted to control the passage through the equalizing pipe beneath the connection with the pipe 12 and prevent atmospheric pressure entering the pan above the milk level when the valve 11 is open.

A sampler or feed pipe 15, of less diameter than the pipe 3, extends from the lower portion of the reservoir 4 upwardly through the pipe 3 and the coupling 13, and turns laterally and is connected in the top of the cylinder 16. The pipe 15, intermediate the coupling 13 and the cylinder 16, is provided with a valve 17 adapted to control back flow through said pipe. The cylinder 16 is provided at its top with a pet cock 18 adapted to admit air to the cylinder, and a sight gage 19 is mounted on the side of the cylinder to enable the operator to read the level of the fluid in the cup.

Extending downwardly and laterally from the bottom of the cylinder 16 is the drain pipe 20, which opens into the pipe 10 beneath the cock 14. Extending laterally from the drain pipe 20 is the sampler pipe 21, which is provided with a sampler cock 22, and mounted on its outer end is the sampler cup 23. The upper portion 24 of the sampler cup is of larger diameter than the lower portion, and its bottom 25 is funnel shaped. A test-cup 26 is carried in the upper portion 24 of the cup 23 and has its lower end extending into the smaller portion of said cup, and is provided with a peripheral flange 27 which seats on the bottom 25 and holds it in place. The top of the test-cup extends slightly above the top of the sampler cup to enable the operator to read more accurately the readings on the testing instrument 28 which may be inserted into the test-cup.

The drain pipe 20 is provided intermediate the cylinder 16 and the pipe 21 with a controlling valve 29, and beneath the pipe 21 with a drain valve 30.

The operation of the construction shown is as follows: All of the valves are closed, and the pan is filled with milk to a point above the reservoir 4 and below the opening of the pipe 10 into the pan, there being a comparatively high vacuum in the pan above the milk. When it is desired to take a sample of the milk the valves 14, 7, 17, 29 and 30 are opened, thereby causing the air in pipes 10, 12, 3, 15, and 20, and in members 16 and 4 to be drawn into the pan until the vacuum in said reservoir, cylinder, and pipes equalizes with that in the pan, and permits the milk to rise up in reservoir 4 and pipes 3 and 15 to the level of the milk in the pan. The valves 29 and 30, and 14 and 7 are then closed and the air valve 11 is opened and atmospheric pressure acting through pipes 12 and 3 force the milk down in the cup 4 and up through the pipe 15 into the cylinder 16. When the milk has raised sufficiently in the cylinder 16 to give a proper quantity for a test, the air cock 11 is closed, and the pet cock 18, controlling valve 29 and sampler valve 22 are opened, thereby permitting the milk to run from the cylinder into the sampler cup and test-cup. When the milk rises to the top of the test-cup the valve 22 is closed and the reading of the instrument 28 may be taken. Since the milk is at the level of the test-cup and above the top of the sampler cup, the reading may be accurately made. After taking the reading, valves 22, 29 and 30 are opened for a short time thereby causing all of the milk in the pipes and cups to be sucked back into the pan and thoroughly clean said pipes ready for another sample.

While but one specific embodiment of the invention has been herein shown and described, it will be understood that many details of the invention shown may be varied or omitted without departing from the scope of the claims.

I claim:

1. A sampler for vacuum pans comprising a pipe or tube in the pan, a sampler cup, a pipe leading to the sampler cup from the pipe within the vacuum pan, and means for admitting atmospheric pressure to said pipe within the pan.

2. A sampler for vacuum pans comprising a pipe or tube in the pan, a sampler cup, means affording connection between said sampler cup and said pipe, a valve controlling the passageway between said pipe said pan, and means adapted to admit atmospheric pressure within said pipe.

3. A sampler for vacuum pans comprising a reservoir within the pan, a pipe or tube connected to said reservoir, means to admit the milk within the vacuum pan into said reservoir, a sampler cup, a pipe connecting said sampler cup to the interior of the pan, and means to admit atmospheric pressure within said reservoir, thereby to force the fluid therefrom.

4. A sampler for vacuum pans comprising a reservoir within the pan, a valve adapted to admit fluid from the pan into said reservoir, an equalizing pipe opening at one end into the pan above the level of the fluid therein contained, and opened at its other end to the atmosphere, an air-valve or a stop-valve in said pipe, a pressure pipe leading from said equalizing pipe to said reservoir, a feed pipe extending into said pressure pipe and into said reservoir, a cylinder connected with said feed pipe, a drain pipe leading from said cylinder to the equalizing pipe below stop-valve, and a test-cup connected to the drain pipe and adapted to receive fluid from said cylinder.

5. A sampler for vacuum pans comprising a cylinder, a test-cup, means connecting said cylinder and said test-cup exterior to the pan above the fluid level within said pan, and means adapted automatically to force the fluid from the pan into said cylinder.

6. A sampler for vacuum pans comprising a cylinder, a test-cup, means operated by atmospheric pressure adapted to convey fluid from the pan to the cylinder, means adapted to admit atmospheric air within the cylinder, and means for conveying fluid from said cylinder to the pan.

In witness whereof I have hereunto subscribed my name in the presence of two witnesses.

CARL A. BAUMANN.

Witnesses:
IRL. H. CARNEY,
LAWRENCE J. MISTELS.